(12) United States Patent
Marttinen et al.

(10) Patent No.: US 6,222,853 B1
(45) Date of Patent: *Apr. 24, 2001

(54) COMMUNICATION SYSTEM FOR A LINE NETWORK

(75) Inventors: Tapio Marttinen, Munich; Markku Korpi, Starnberg, both of (DE)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,115

(22) Filed: Sep. 30, 1997

(30) Foreign Application Priority Data

Sep. 30, 1996 (DE) .............................. 196 40 223

(51) Int. Cl.⁷ ................. H04Q 9/00; H04B 3/54
(52) U.S. Cl. .............. 370/465; 340/825.06; 379/399
(58) Field of Search ................... 370/235, 252, 370/257, 459, 461, 465; 323/221, 320, 324; 340/825.06, 517, 310.06; 379/21, 27, 28, 157, 399

(56) References Cited

U.S. PATENT DOCUMENTS

| | | | |
|---|---|---|---|
| 5,018,138 | * 5/1991 | Twitty et al. | 370/461 |
| 5,406,191 | * 4/1995 | Salo | 323/320 |
| 5,471,190 | * 11/1995 | Zimmermann | 340/310.01 |

FOREIGN PATENT DOCUMENTS

| | | |
|---|---|---|
| 0 445 375 A1 | 11/1990 | (EP) . |
| WO 90/15394 | 12/1990 | (WO) . |
| WO 92/02981 | * 2/1992 | (WO) . |

OTHER PUBLICATIONS

DE–Z; L. Brackmann; "Geisterhande, IBM–Arigo: Intelligente Steckdosen", In: Elrad, 1996, Heft 1, S. 26027.

* cited by examiner

Primary Examiner—Wellington Chin
Assistant Examiner—Frank Duong
(74) Attorney, Agent, or Firm—Schiff Hardin & Waite

(57) ABSTRACT

A method is specified for operating a communication and/or control system via a line network equipped with socket outlets, in which for the supply of a standardized supply voltage at least one transmission line is connected to at least one socket outlet, which line is connected with an apparatus via a plug connected into the socket outlet and on which apparatus-specific signals are transmitted. The transmission takes place according to one of at least two selectable transmission protocols, whereby one of the two transmission protocols is selected according to the type of device which is connected.

22 Claims, 3 Drawing Sheets

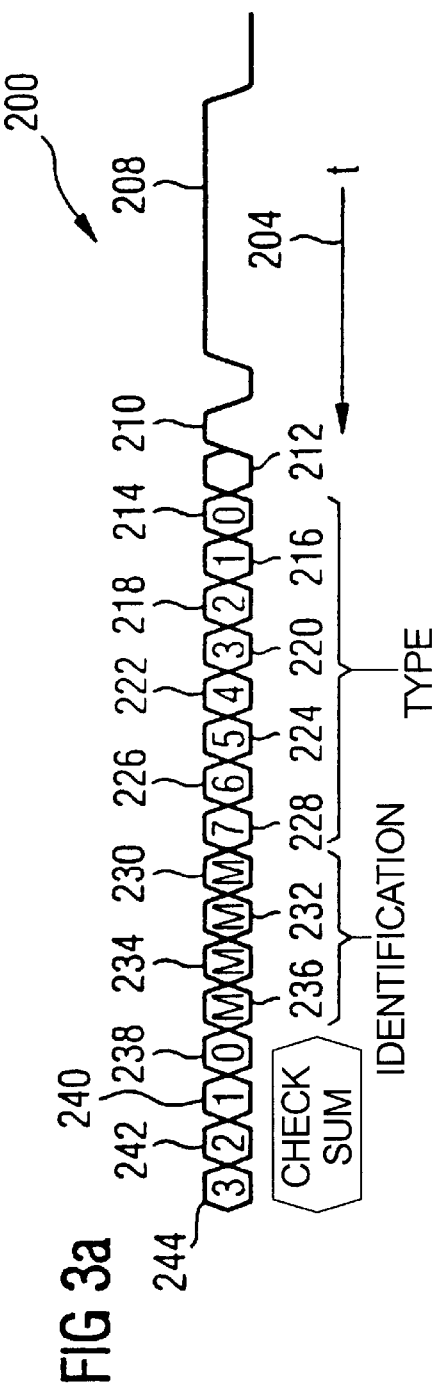
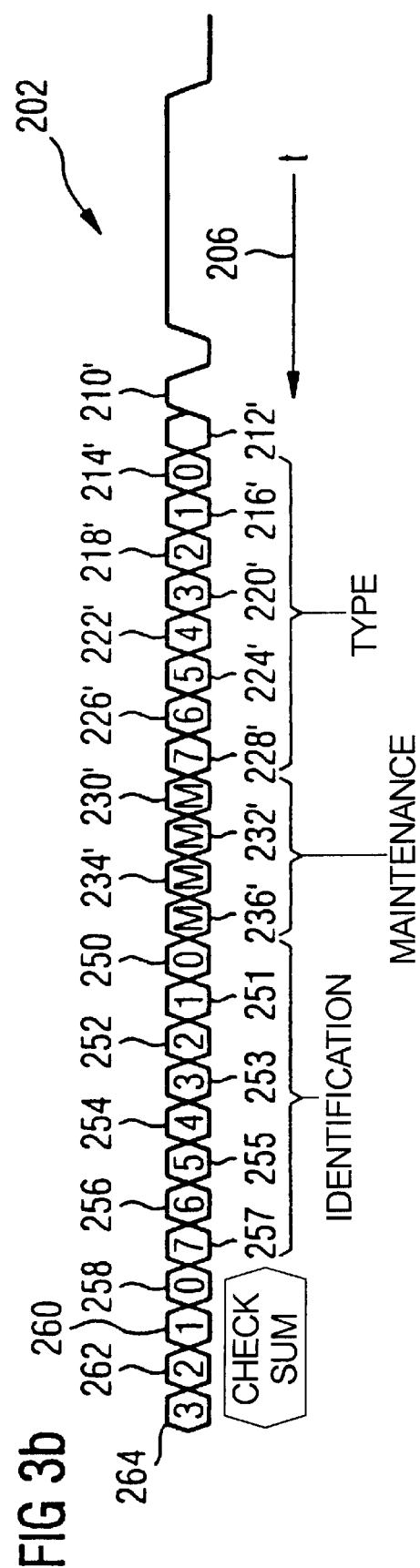

COMMUNICATION SYSTEM FOR A LINE NETWORK

BACKGROUND OF THE INVENTION

1. Field of the Invention

The present invention relates generally to the field of electronic controls and, more particularly, the present invention relates to a method for operating a communication system and/or control system via a line network equipped with socket outlets in which at least one transmission line is arranged in at least one socket outlet for supplying standardized supply voltage.

2. Description of the Related Art

A method for operating a control system of this type is set forth in PCT application WO 89/12950, which employs a thyristor control. In this known method, ignition impulses for the thyristor are transmitted via the transmission line. The thyristor is an essential part of a brightness control for lighting a room. The principle of operation employs the phase intersection control of the thyristor, in which driving takes place differently depending on the timing of a respective ignition impulse of the thyristor. An analog phase signal thus finally controls the thyristor, so that the transmission protocol comprises only a transmission of the ignition impulses. The preset phase position of the ignition impulses, causes a desired brightness of the lighting.

With this known control system, lighting installations in a building can be controlled. However, this is only a small partial area of the overall field of building services management. Besides supply voltage lines and lines for simple control tasks, among other things telephone lines, lines for computer networks, lines for transmitting radio data and lines for transmitting television data are also included in building services management. This known lighting control system thus realizes only a small part of the tasks to be realized in the field of building services management.

The expense for the installation of the known control system and the cited line networks is high. In particular, it is customary to install a separate line network in the rooms of the building for each of these networks. As a result, there are significant material costs, costs of operating time, and, in case of failure, repair costs in each of these line networks.

One aim of the present invention is to provide a simple method for operating a communication system and/or control system that reduces operating expense, materials expense, installation expense and maintenance expense in the field of building services management. Other objects and advantages of the present invention will be apparent from the following summary and detailed description of the preferred embodiments.

SUMMARY OF THE INVENTION

In the present invention, transmission takes place according to one of at least two selectable transmission protocols, whereby one of the two transmission protocols is selected according to the type of apparatus which is plugged in.

The present invention is based on the recognition that the socket outlets already present in each building can be used to operate a communication system and/or control system. The supply voltage network standardized in each country, including standardized plug sockets, is particularly well suited for the construction of a communication system and/or control system, because the devices that belong to the communication and/or control system require a standard supply voltage. Moreover, the supply voltage lines are the lines which account for the largest use of material. If the existing supply voltage network is also included in the construction of the communication system and/or supply system, then the complete construction of additional separate networks can be avoided. There are synergy effects, consisting, for example, in that plug sockets and plugs need be modified only slightly, and voltage supply cables to the apparatuses also transmit control signals or communication signals, in addition to the supply voltage on transmission lines contained in supply voltage cables. The installation of additional cable can be avoided by means of the invention.

In the present invention, the transmission is carried out according to one of at least two selectable transmission protocols. These transmission protocols can be, for example, protocols for transmission of digital speech signals during telephoning, protocols for transmitting digital radio data, protocols for transmitting digital image data, simple analog or digital control protocols, simple analog sensor protocols and/or protocols for transmitting digital data between different data processing apparatuses.

For each selectable transmission protocol, it is possible to do without an additional line network. The invention thus has the result that the standard supply voltage network is the only line network in a building. It is combined only with the transmission line for the transmission of the apparatus-specific signals. Within the individual transmission protocols, different transmission speeds can be defined for the respective transmission protocol.

In the present invention, the transmission protocol is selected according to the type of apparatus being used. This means that an allocation ensues between devices that can be operated in the communication system and/or control system and selectable transmission protocols, as well as, if warranted, an allocation of transmission speeds. A determined transmission protocol is allocated to each type of connected apparatus.

In an exemplary embodiment of the invention, the transmission line is an optical cable, such as, for example, a glass fiber cable. The transmission of the apparatus-specific signals on the optical cable has the result that disturbances due to the supply line conducted immediately adjacently are excluded. Moreover, the spacings prescribed according to country-specific standardized regulations between supply voltage lines and galvanic signal lines do not have to be maintained during an optical transmission.

In a further exemplary embodiment of the invention, a device identifier is generated at the device, which uniquely identifies at least the type of device. The device identifier is transmitted via the data line, and the type of device connected is subsequently determined on the basis of the device identifier. This exemplary embodiment is based on the consideration that the socket outlets of the standardized supply voltage network are likewise standardized. It is thus unavoidable that devices of the most widely varying types can be plugged into one and the same socket outlet, using plugs of identical construction.

In order to avoid damage to devices, and to ensure correct operation of the various device types, measures must be taken permitting allocation of a connected device to one of the transmission protocols. In the exemplary embodiment of the invention, this measure consists in the production of a device identifier or by the device or by the plug connected with the device. After the connection of the plug connected with the device into the socket outlet, the device identifier is transmitted via the data line. In a control unit, the type of device connected can be determined on the basis of the device identifier. An allocation of a transmission protocol to a socket outlet, and thus to a connected device, is thus possible without expensive manual programming processes. If the device identifier is also manually produced, the manual expense is thus limited merely to the connection of the device using the plug.

The method according to the exemplary embodiment of the invention also has the result that the control unit is relieved of stress, since the device-specific signals do not have to be addressed for or, respectively, by particular device. After the control unit has determined, on the basis of the device identifier, which type of device is connected with the respective data line, only signals required for this device are transmitted on the data line, i.e. sent to the device and/or received by the device.

If the device identifier is sent several times in succession at the device, the control unit can determine when the plug of the device is removed from the socket outlet, since in this case the device identifier can no longer be received. By means of this measure, it is possible for the control unit actually to transmit the device-specific data only via a transmission line to which a device is connected. Moreover, the control unit also expects only signals on a transmission line that is actually connected with a device. In this way, the means contained in the control unit can be used effectively; e.g., no time is wasted on superfluous transmission of signals or superfluous waiting for signals.

The transmission of the device identifier can take place upon request by the control unit, or else it can be repeated after a predetermined time. In the first case, the expense at the device is lower; however, for this an extra expenditure must be operated in the control unit for the transmission of the request. In the second case, a timer is provided at the device; however, the control unit is relieved of stress.

The device identifier is usefully sent only when no signals are currently being transmitted on the transmission line. By means of this measure, interruptions of the signal transmission are prevented by the transmission of the device identifier. The transmission of the device thereby has no influence on the transmission speed of the signals. Moreover, in the case of the transmission of signals to the control unit by the device, the control unit can already determine on the basis of an interrupted signal transmission that the device is no longer connected with the data line.

In an exemplary embodiment of the invention, the connected device is identified on the basis of a transmitted identification symbol contained in the device identifier, which identification symbol unambiguously identifies the device in the manner of an identification code. The identification code can, for example, contain a name or a number.

By this measure, it is achieved that in the control unit or, respectively, in the receiver of the device identifiers, not only are items of information provided concerning the type of a connected device, but different devices within a type of device can also be distinguished on the basis of the identification. If the identifications are, for example, allocated to various users, then the control unit can allow or forbid communication processes and/or control processes, depending on the respective user.

In an exemplary embodiment of the invention, the communication system and/or control system contains an input unit with at least two threshold units. The input unit is realized in such a way that on the basis of the threshold values it is recognized on which data line a device was connected. For the evaluation of the signals of the threshold unit, only the relevant data line is connected with the control unit, using a multiplexer addressing unit. A processing logic for the threshold values is thus required only once for the threshold values. There thus results an input unit that is of simple construction.

The device identifier is usefully divided into several parts. Thus, the type of connected device can be stored in a type part, items of information concerning the state of the connected device can be encrypted in a maintenance part, and, in a part for error determination, e.g. check sums can be stored, on the basis of which the correct transmission of the device identifier on the transmission line can be checked.

By means of a status bit in the device identifier, it can be indicated whether the device identifier also contains an identification part that unambiguously identifies the connected device in the manner of a name. By means of the status bit, the length of the device identifier can be matched to the respectively connected device. Given a shorter device identifier, the expense for producing the device identifier and the expense for evaluating the device identifier is thereby reduced.

Another aspect of the invention concerns a device adapter for the communication system and/or control system. By means of the adapter, an intervention in the apparatus can be omitted, since the device identifier is produced in the adapter. In an exemplary embodiment of this aspect of the invention, the device identifier is automatically produced at least once when the plug of the adapter is connected into the socket outlet, so that, apart from the connecting of the plug, no manual activity is required.

The invention is explained on the basis of exemplary embodiments in more detail below.

BRIEF DESCRIPTION OF THE DRAWINGS

FIG. 3 illustrates the components of a device identifier.

DETAILED DESCRIPTION OF THE PREFERRED EMBODIMENTS

Figure 1:
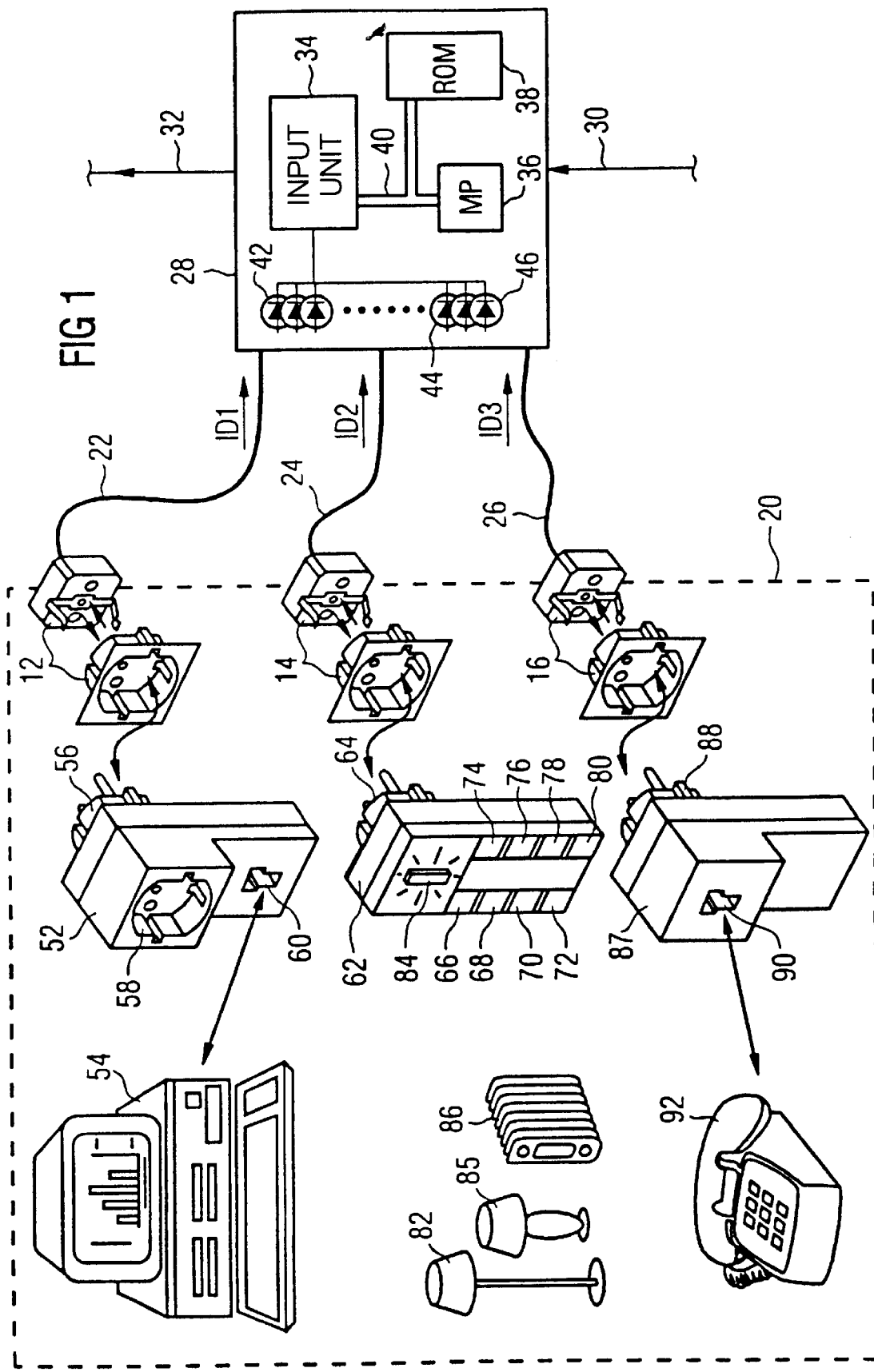
FIG. 1 illustrates a communication and control system for a line network having socket outlets of the present invention.

FIG. 1 illustrates a communication and control system 10 for a line network (not shown) equipped with socket outlets 12 to 16 for supplying a standardized supply voltage, e.g. 220V. The socket outlets 12 to 16 are located in the walls of a room 20 in a building, and are connected with a room control unit 28 via glass fiber cables 22, 24 or, respectively, 26. The room control unit 28 is connected with other room control units (not shown) for other rooms via two lines 30 and 32. The room control units of a floor are preferably connected with one another in annular fashion. In each ring, there is a central control unit for the respective floor. Via the connection of central control units of several floors, there arises a communication and control system for the entire building in which the existing supply voltage network is used.

The glass fiber cables 22 to 26 are connected with the room control unit 28 via an input unit 34. The glass fiber cable 22 is connected with the input unit 34 via a photodiode 42. The glass fiber cable 24 or, respectively, 26 is connected with the input unit 34 via a photodiode 44 or, respectively, 46. The photodiodes 42 to 46 can send out optical signals from the room control unit 28, and, in a second type of operation, can receive optical signals from the glass fiber cables 22, 24 or, respectively, 26.

The room control unit 28 additionally contains a microprocessor 36 and a memory 38, which are both connected with a bus system 40 consisting of data lines and control lines. The bus system 40 is also connected with the input unit 34. The microprocessor 36 evaluates, for example, the output signals from the input unit 34, and initiates predetermined control processes according to a predetermined control program. The microprocessor additionally transmits data between the line 30 and the glass fiber cables 22, 24 or, respectively, 26, as well as in the inverse direction from the glass fiber cables 22, 24 or, respectively, 26 to the line 32.

In the exemplary embodiment of FIG. 1, an adapter 52 is plugged into the socket outlet 12, which enables the connection of a data processing means 54 to the communication and control system 10. The adapter 52 is plugged into the socket outlet 12 via a plug 56. In the adapter 52, there is a socket outlet 58 into which a network plug (not shown) of the data processing means 54 is plugged. Moreover, on the adapter 52 there is a western socket 60 for the connection of a modem, with which digital data is transmitted from and/or to the data processing means 54.

A control console 62 with a plug 64 is plugged into the socket outlet 14. The control console 62 contains selection buttons 66 to 80. The selection button 66 is allocated to a first lamp 82, which is connected to a socket outlet of the room 20. If the button 66 is actuated, the brightness for the lamp 82 can be determined via a rotary switch 84. In the same way, the brightness for a further lamp 85 in the room 20 can be determined using the selection button 68. The selection button 70 permits the predetermination of a temperature value via the rotary switch 84 for a heating unit 86 that heats the room 20. The other selection buttons 72 to 80 can be assigned further functions. An adapter 87 with a plug 88 can be plugged into the socket outlet 16. The adapter 86 has a western socket 90 for the connection of a telephone 92.

Device identifiers ID1 to ID3 are produced by the adapters 52, 87 and the control console 62. The device identifier ID1 is produced by the adapter 52, the device identifier ID2 is produced by the control console 62, and the device identifier ID3 is produced by the adapter 87. The device identifiers ID1, ID2 or, respectively, ID3 are transmitted via the glass fiber cable 22, 24 or, respectively, 26, according to a clock signal produced in the adapter 52, in the control console 62, or, respectively, in the adapter 87. The device identifiers ID1 to ID3 are of identical construction. Their construction is further explained below with reference to FIG. 3.

By means of the device identifiers ID1, ID2 and ID3, it is possible for the control unit 28 to select, for the connected devices (i.e., for the data processing device 54, the control console 62 and the telephone apparatus 92), allocated transmission protocols and transmission speeds according to which signals are transmitted on the glass fiber cables 22 to 26 to the respective device from the control unit 28, or, respectively, from the respective apparatus to the control unit 28. By means of the repeated transmission of the device identifiers ID1 to ID3 via the glass fiber cables 22 to 26, it is possible in the control unit 28 to register the removal of the adapter 52, of the control console 62 or of the adapter 87.

Figure 2:
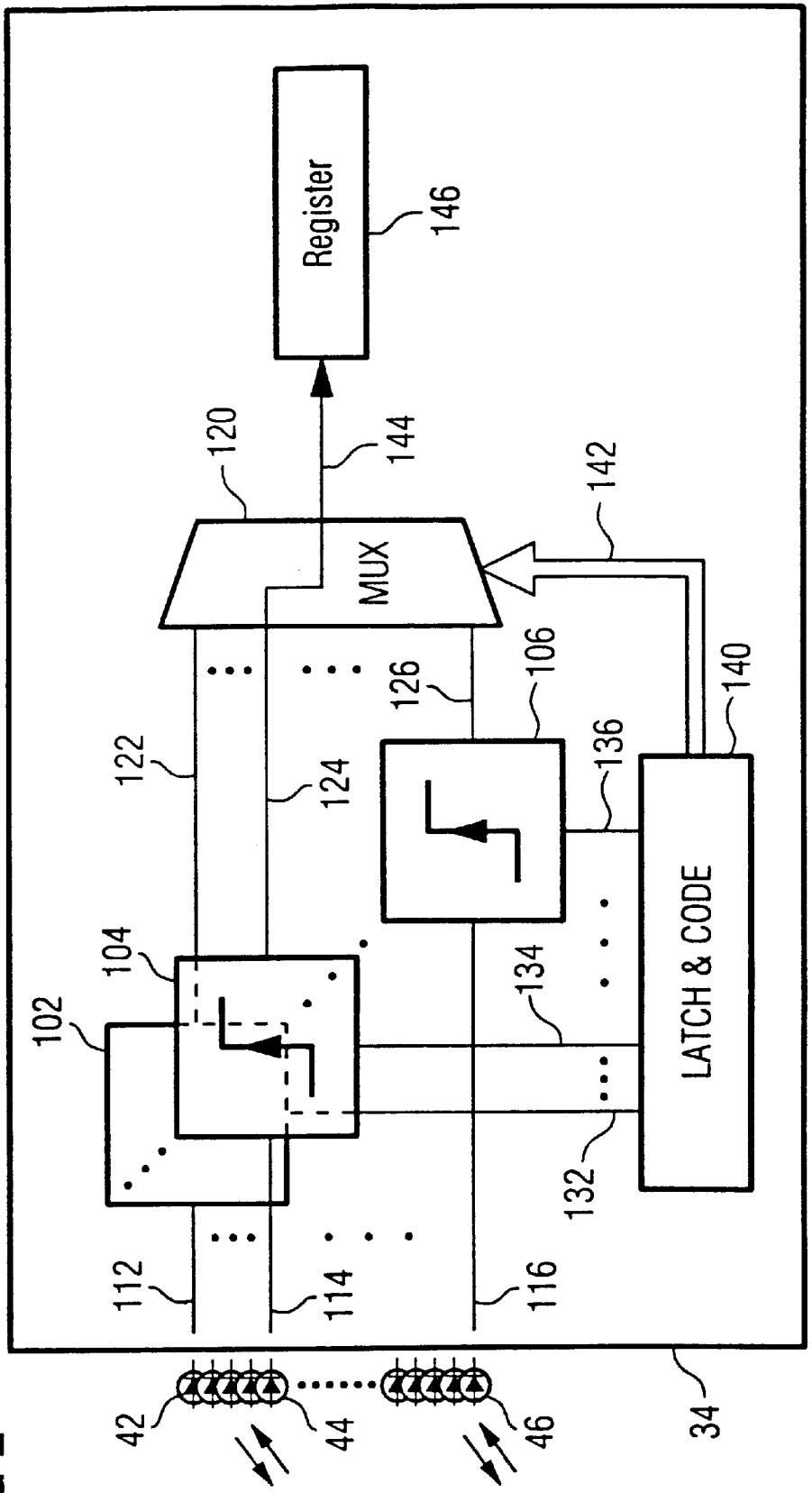
FIG. 2 is a schematic diagram of the input unit of a room control unit.

FIG. 2 shows a schematic diagram of the input unit 34, which contains 32 threshold units, of which the threshold units 102, 104 and 106 are shown in FIG. 2. The threshold unit 102 is connected at the input side with the photodiode 42 via a line 112. The threshold unit 104 or, respectively, 106 is connected at the input side with the photodiode 44 or, respectively, 46, via a line 114 or, respectively, 116.

The input of the threshold unit 102 or, respectively, the line 112 is connected with the first input of a multiplexer 120 via a line 122. The input of the threshold unit 104 or, respectively, 106 is connected with a second input or, respectively, with a third input of the multiplexer via a data line 124 or, respectively, 126.

The threshold units 102 to 106 detect voltage fluctuations on the line 112, 114 or, respectively, 116. These voltage fluctuations result from a changed diode current of the photodiodes 42, 44 or, respectively, 46 upon reception of optical signals via the glass fiber cables 22, 24 or, respectively, 26. If a threshold is exceeded in the threshold unit 102, a voltage value of about 5V is produced on a signal line 132 at the output of the threshold unit 102. If on the other hand a threshold is exceeded in the threshold unit 104 or, respectively, 106, a voltage value of 5V is produced on a signal line 134 or, respectively, 136. The signal lines 132 to 136 are connected with inputs of a coding unit 140, which allocates to each of its inputs an address code that is output at the output of the coding unit 140.

Address lines 142 are connected with the output of the coding unit 140, which transmit the address code from the coding unit 140 to selection inputs of the multiplexer 120. In the multiplexer 120, depending on the address code on the address lines 142, one of the lines 122, 124, 126 is connected with the output of the multiplexer. A line 144 is connected at the output of the multiplexer, which line is connected with a register 146. The register 146 contains an additional logic for the removal of preambles (cf. FIG. 3, 208, 208') for synchronization in the device identifiers ID1 to ID3.

Moreover, the additional logic appends a number for the respective socket outlet 12 to 16, via which the respective device identifier ID1 to ID3 was transmitted, to the device identifier ID1 to ID3 in the register 146. The register 146 is divided into subregisters, in which the components of the device identifiers ID1 to ID3, explained on the basis of FIG. 3, are contained. If the grouping in register 146 is closed, the input unit 34 sends an interrupt signal to the microprocessor 36, which subsequently takes over the processing of the device identifier ID1 to ID3 in register 146.

The production of the address code in the coding unit 140 takes place in such a way that e.g. when the threshold value is exceeded in the threshold unit 104, as shown in FIG. 2, the line 124 is connected with the line 144 at the output of the multiplexer 120. When a threshold value is exceeded in the threshold unit 102 or, respectively, 106, the line 122 or, respectively, 126 is connected with the line 144. The device identifier ID1, ID2, or, respectively, ID3 can thus be transmitted by the photodiode 42, 44 or, respectively, 46 via the lines 112, 114 or, respectively, 116; the line 122, 124 or, respectively, 126 the multiplexer 120, as well as the line 144 to the register 146, where it is stored.

Conflicts between different device identifiers ID1 to ID3 are avoided in that there is a data buffer (i.e. a latch) in the coding unit 140 that is updated only at certain times. If a voltage value of 5V is registered on one of the signal lines 132 to 136, an updating of the buffer only after a time required for the correct writing to and reading of the register 146 takes place.

In addition, exceedings of the threshold are registered only if after the plugging of the plugs 56, 64 or, respectively, 88 on the respective line 112, 114 or, respectively, 116, no device identifier ID1, ID2 or, respectively, ID3 has yet been correctly transmitted to the register 146.

The functioning of the input unit 34 is not time-critical, since as a rule only one of the plugs 56, 64 or, respectively, 88 is connected in at a particular time. Even a simultaneous connection of several of the plugs 56, 64 or, respectively, 88 is uncritical, since previously connected plugs have stored their device identifiers in the register 146 after a few milliseconds. For a user of the respective other device, a delay of this sort is insignificant.

FIG. 3 illustrates the components of one of the device identifiers ID1 to ID3. In part a, a short apparatus identifier 200 is shown, and a long device identifier 202 is shown in part b of FIG. 3. An arrow 204 or, respectively, 206 symbolizes the time axis, which runs respectively from right to left in parts a and b of FIG. 3, whereby later times stand further to the left than earlier times.

The short device identifier 200 contains several bits that form a preamble 208, which is used for synchronization during storage of the device identifier 200 in register 146 (cf. FIG. 2). After the preamble 208, the beginning of the useful information of the device identifier 200 is indicated by a start bit 210. After the start bit 210, there follows a flag 212, which indicates whether a short device identifier 200 or a long device identifier 202 is concerned. In the case of the short device identifier 200, the flag 212 has the value "0".

After the flag 212 there follow eight type bits 214 to 228, in which the type of device is encoded. Exactly one of the possible occupations of the type bits 214 to 228 is assigned to each device type. For example, the binary bit sequence "0000100" is assigned to the data processing means 54 (cf. FIG. 1).

After the type bit 228, there follow four maintenance bits 230 to 236, whose concrete occupation indicate the state of the device that produced the short device identifier 200. The current readiness for operation counts for example as a state.

At the end of the short device identifier 200, there are four check sum bits 238 to 244, which contain a check sum over the bits 210 to 236. On the basis of the check sums of the check sum bits 238 to 244, it can be determined whether bits 210 to 236 have changed their value during the transmission of the device identifier 200. If this is the case, there is an error, so that the transmission of the device identifier 200 has to be repeated.

The long device identifier 202 shown in part b of FIG. 3 has, in a first part, the same construction as the short device identifier 200. Accordingly, the reference characters already explained do not need to be explained again. Already-explained reference characters are identified in part b of FIG. 3 with a prime indication. The status bit 212' has the value "1" in the device identifier 202, which value indicates a long device identifier 202.

In the device identifier 202, the last maintenance bit 236' is followed by eight identification bits 250 to 257, with which the device associated with the device identifier 200 can be unambiguously identified. After the last identification bit 257, there follow four check sum bits 258 to 262, containing a check sum over the bits 210' to 236', as well as the bits 250 to 257. On the basis of the check sums in the check sum bits 258 to 262, errors in the transmission of the device identifier 202 can be recognized.

In the exemplary embodiment according to FIGS. 1 to 3, the device identifiers ID1 to ID3 are transmitted every ten milliseconds via the glass fiber cables 22, 24 or, respectively, 26. The room control unit 28 applies a status register for each plugged-in device, said register containing the items of information of the apparatus identifier ID1 to ID3 associated with the respective device. In addition, items of information about the plug sockets 12 to 16 are present in the status registers. A plug socket number is attached to the respective device identifier, said number permitting an identification of the plug sockets 12 to 16.

The device identifiers ID1 to ID3 are all transmitted according to a uniform transmission protocol with the same transmission speed, which protocol is selected as a presetting on glass fiber cables 22 to 26 that are not being used. During operation of a plugged-in device, a different transmission protocol can be selected. If the adapter associated with the device is removed from one of the plug sockets 12 to 16, the transmission protocol is again selected for the device identifiers ID1 to ID3 by the room control unit 28.

During registration of repeatedly sent device identifiers ID1 to ID3, a circuit similar to the one shown in FIG. 2 is used. Within a larger time interval of a second, each device will have to have transmitted its device identifier ID1 to ID3 at least once into a register corresponding to the register 146. If this is not the case, the status register in the control unit 28, which is allocated to this unit, is erased. The respective glass fiber cable 22 to 26 is considered unused until a new connection of a device into the allocated plug sockets 12, 14 or, respectively, 16 has taken place.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for operating an electrical system comprising the steps of:
   providing a line network in which at least one transmission line for transmitting device-specific digital data is connected to at least one socket for providing a supply voltage, the transmission line being connected with a device via a plug connected into the socket;
   selecting one of at least two selectable device-specific transmission protocols for transmitting digital data, the selection depending on a type of the device which is connected; and
   transmitting digital data over the transmission line according to the one selected device-specific transmission protocol.

2. A method according to claim 1, wherein signals transmitted on the transmission line contain digital data.

3. A method according to claim 1, further comprising steps of: generating a device identifier at the device which unambiguously identifies at least the type of the device;
   transmitting the device identifier via the transmission line; and
   determining the type of device based on the device identifier.

4. A method according to claim 3, wherein the device identifier is generated automatically.

5. A method according to claim 3, wherein the device identifier is transmitted several times in succession.

6. A method according to claim 5, further comprising a step of sending the device identifier to a control unit.

7. A method according to claim 5 wherein the transmission of the device identifier is repeated after a predetermined time.

8. A method according to claim 3, wherein the device identifier is transmitted only if no signals are currently being transmitted on the transmission line.

9. A method according to claim 3, wherein the device is identified on the basis of an identification code contained in the device identifier which unambiguously identifies the device.

10. A control system for a line network comprising:
at least one socket connected to a supply voltage line and to a transmission line, said transmission line transmitting device-specific digital data;
a control unit connected to the transmission line for transmitting device-specific digital data between said control unit and a device connected to the socket via a plug; and
a selection unit for selecting one of at least two device-specific transmission protocols for transmitting digital data, the selection depending on a type of a device.

11. A control system according to claim 10, wherein the selection unit selects the transmission protocol depending on a device identifier that is produced at the device which unambiguously identifies at least the type of the device.

12. A control system according to claim 10, further comprising an input unit with at least two threshold units, wherein a first threshold unit is connected at an input side to a first socket outlet with the transmission line, and second threshold unit is connected at an input side to a second socket outlet with the transmission line, a first input of a multiplexer is connected to the first socket outlet with the transmission line and a second input of the multiplexer is connected to the second socket outlet with the transmission line;
a register is connected with an outlet of the multiplexer, and wherein a multiplexer address unit produces a selection signal on selection lines connected with the selection inputs of the multiplexer.

13. A control system according to claim 12, wherein the input unit signals a change of a content of the register to the control unit.

14. A control system according to claim 11, wherein the control unit contains a status register associated with a connected device and the device identifier is stored therein.

15. A control system according to claim 14, wherein the status register is updated in response to an update signal produced by an input unit connected to said transmission line.

16. A control system according to claim 10 wherein the transmission line is comprised of optical fiber.

17. A control system according to claim 11, wherein the device identifier contains a type portion which identifies a type of device.

18. A control system according to claim 11, wherein the device identifier contains a maintenance portion in which a state of the device is identified and the device identifier contains an error correction portion.

19. A control system according to claim 11, wherein the device identifier contains an identification portion containing an identification, which identifies the device.

20. A control system according to claim 19, wherein the identification portion is contained in the device identifier only if a status bit in the device identifier has a value that indicates that the identification portion is contained in the device identifier.

21. A device adapter for a control system comprising:
a plug for insertion into a socket for supplying a supply voltage, the socket being connected to a transmission line for transmitting device-specific digital data; and
a device identifier generator for producing a device identifier that identifies at least a type of a device connected to said device adaptor, said generator transmitting the device identifier over the transmission line, said generator transmitting being used for selecting on of at least two device-specific transmission protocols for transmitting digital data, the selection depending on a type of a device.

22. A device adapter according to claim 21, wherein the device adapter automatically sends the device identifier at least once upon connecting the plug into the socket.

* * * * *